United States Patent
Chuang et al.

(10) Patent No.: US 9,143,837 B2
(45) Date of Patent: Sep. 22, 2015

(54) METHOD FOR PROVIDING AN ELECTRONIC PROGRAM GUIDE, MULTIMEDIA REPRODUCTION SYSTEM, AND COMPUTER READABLE STORAGE MEDIUM

(71) Applicant: Wistron Corporation, New Taipei (TW)

(72) Inventors: Ching-Yuan Chuang, New Taipei (TW); Li-Hsuan Chen, New Taipei (TW); Hung-Yang Hsu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 13/951,498

(22) Filed: Jul. 26, 2013

(65) Prior Publication Data

US 2014/0259072 A1    Sep. 11, 2014

(30) Foreign Application Priority Data

Mar. 11, 2013   (TW) .............................. 102108481 A

(51) Int. Cl.
*H04N 21/482* (2011.01)
*H04N 21/431* (2011.01)

(52) U.S. Cl.
CPC ....... *H04N 21/4821* (2013.01); *H04N 21/4314* (2013.01); *H04N 21/4828* (2013.01)

(58) Field of Classification Search
CPC . H04N 21/482; H04N 21/47; H04N 21/4314; H04N 21/43; H04N 21/4821; H04N 21/4828
USPC ......................................... 725/44, 47, 39, 46
See application file for complete search history.

(56) References Cited

U.S. PATENT DOCUMENTS

| 6,172,677 | B1 | 1/2001 | Stautner et al. |
| 7,685,619 | B1 | 3/2010 | Herz |
| 2001/0016945 | A1* | 8/2001 | Inoue .............................. 725/44 |
| 2005/0097603 | A1* | 5/2005 | Kikinis .......................... 725/44 |

(Continued)

FOREIGN PATENT DOCUMENTS

| CN | 102158761 A | 8/2011 |
| JP | 2000112976 | 4/2000 |

(Continued)

OTHER PUBLICATIONS

KIPO Office Action dated Jun. 17, 2014.

(Continued)

*Primary Examiner* — Benjamin R Bruckart
*Assistant Examiner* — Tien M Nguyen
(74) *Attorney, Agent, or Firm* — McClure, Qualey & Rodack, LLP

(57) ABSTRACT

Method for providing an electronic program guide includes the following steps. First electronic program list data is grouped according to at least two condition factors not related to program broadcasting time to generate at least a first set of two-dimensional program list data. A display unit of a multimedia reproduction system is controlled to display the at least the first set of two-dimensional program list data on a screen thereof, wherein the screen displays a plurality of image blocks on a first plane, the image blocks on the first plane individually represent at least a portion of programs corresponding to the first set of two-dimensional program list data and are arranged according to first and second coordinate axes corresponding to first and second condition factors. When the system receives a selection indication, a program represented by one image block corresponding to the selection indication is played on the screen.

13 Claims, 8 Drawing Sheets

(56) References Cited

U.S. PATENT DOCUMENTS

| | | |
|---|---|---|
| 2006/0143654 A1 | 6/2006 | Mochiduki |
| 2006/0271955 A1 | 11/2006 | Saito et al. |
| 2007/0011702 A1 | 1/2007 | Vaysman |
| 2008/0271080 A1* | 10/2008 | Gossweiler et al. ............ 725/47 |
| 2009/0049477 A1* | 2/2009 | Park et al. ....................... 725/44 |
| 2009/0109224 A1 | 4/2009 | Sakurai |
| 2009/0208191 A1 | 8/2009 | Imai et al. |
| 2010/0131984 A1* | 5/2010 | Kim ................................ 725/47 |
| 2010/0287587 A1* | 11/2010 | Patten et al. .................... 725/39 |
| 2011/0167385 A1 | 7/2011 | Charrue et al. |

FOREIGN PATENT DOCUMENTS

| | | |
|---|---|---|
| KR | 1020070074246 | 7/2007 |
| KR | 1020100057463 A | 5/2010 |
| TW | 200704183 A | 1/2007 |
| WO | 2008045305 A2 | 4/2008 |

OTHER PUBLICATIONS

English translation of KR10-2007-0074246 (Published Jul. 12, 2007).

JP Office Action dated Nov. 11, 2014.

EP Search Report dated Jan. 8, 2014.

English Abstract translation for JP2000112976 (Published Apr. 21, 2000).

KIPO Office Action dated Dec. 24, 2014.

\* cited by examiner

Grouping first electronic program list data according to at least two condition factors from a plurality of condition factors to generate at least a first set of two-dimensional program list data, wherein the at least two condition factors are not related to program broadcasting time ~ S110

Displaying the at least the first set of two-dimensional program list data on a screen of a multimedia reproduction system, wherein the screen displays a plurality of image blocks on a first plane, the image blocks individually represents at least a portion of programs corresponding to the first set of two-dimensional program list data and are arranged on the first plane according to first and second coordinate axes corresponding to first and second condition factors of the at least two condition factors ~ S120

FIG. 3

|  | A1 | B1 | B2 | X | Programs published from latest to earlier |
|---|---|---|---|---|---|
| CH1 | PRG1 12/5 08:00 | PRG2 12/4 19:24 | PRG3 12/4 15:57 | PRG4 12/5 08:00 | ... |
| CH2 | PRG1 12/5 09:16 | PRG2 12/5 07:35 | PRG3 12/4 15:57 | PRG4 12/3 10:42 | ... |
| CH3 | PRG1 12/5 02:05 | PRG2 12/4 21:19 | PRG3 12/2 17:28 | PRG4 12/1 05:30 | ... |
| CH4 | PRG1 12/4 18:58 | PRG2 12/1 19:36 | PRG3 11/30 12:51 | PRG4 11/29 06:52 | ... |
| CH5 | PRG1 12/5 10:26 | PRG2 12/5 08:24 | PRG3 12/5 06:30 | PRG4 12/4 22:17 | ... |

FIG. 5

|  | A1 | B1 | B2 | X | Programs by length in time |
|---|---|---|---|---|---|
| CH1 | PRG1 60m25s | PRG2 48m12s | PRG3 38m24s | PRG4 30m58s | ... |
| CH2 | PRG1 15m42s | PRG2 14m13s | PRG3 12m29s | PRG4 12m07s | ... |
| CH3 | PRG1 31m47s | PRG2 30m29s | PRG3 29m27s | PRG4 25m56s | ... |
| CH4 | PRG1 26m12s | PRG2 24m53s | PRG3 20m28s | PRG4 19m17s | ... |
| CH5 | PRG1 6m32s | PRG2 5m57s | PRG3 5m34s | PRG4 4m52s | ... |

FIG. 6

METHOD FOR PROVIDING AN ELECTRONIC PROGRAM GUIDE, MULTIMEDIA REPRODUCTION SYSTEM, AND COMPUTER READABLE STORAGE MEDIUM

This application claims the benefit of Taiwan application Serial No. 102108481, filed Mar. 11, 2013, the subject matter of which is incorporated herein by reference.

BACKGROUND

1. Field

The disclosure relates in general to a method for providing an electronic program guide, multimedia reproduction system, and computer readable storage medium.

2. Description of the Related Art

Transmitting videos via the broadband Internet is currently a prevalent alternative way for watching videos or television programs. The smart televisions, nowadays, can play Internet videos or Internet TV.

Many sources of television channels arise currently, such as video programs provided by a number of Internet video providers (such as YouTube) as well as the digital television channels. It is important that how the programs that someone wants to watch can be found as fast as possible. Regarding this, electronic program guides (EPG) are available but presented in a fixed arrangement: its vertical axis taken as indicating channels and horizontal axis taken as indicating programs of the corresponding channels, arranged according to the program time. After keyword searching the EPG is done, the search result is listed item by time in a vertical manner. The search result sometimes is too long and inconvenient to find the program one wants. In addition, for the well-known website YouTube, the searching is also performed for one condition per time and the search result is also shown item by item in a vertical manner.

In addition, with diversified contents and types provided by the Internet, a relaxed atmosphere of enjoying watching the television as originally intended may instead turn out to be serious and complicated. In this way, such a television causes difficulties of usage in a family or group and fails to satisfy the needs of different users, for example, those who are unfamiliar with operating a computer.

SUMMARY

The disclosure is directed to a method for providing an electronic program guide, multimedia reproduction system, and computer readable storage medium.

According to an embodiment of the disclosure, a method for providing an electronic program guide is provided. The method includes the following steps. (a) First electronic program list data is grouped according to at least two condition factors from a plurality of condition factors to generate at least a first set of two-dimensional program list data, wherein the at least two condition factors are not related to program broadcasting time. (b) A display unit of the multimedia reproduction system is controlled to display the at least the first set of two-dimensional program list data on a screen of the multimedia reproduction system, wherein the screen displays a plurality of image blocks on a first plane, the image blocks on the first plane individually represent at least a portion of programs corresponding to the first set of two-dimensional program list data and are arranged according to first and second coordinate axes corresponding to first and second condition factors of the at least two condition factors. When the system receives a selection indication, a program represented by one of the image blocks corresponding to the selection indication is played on the screen of the system.

Another embodiment provides a computer readable storage medium having stored program code of one or more program modules, which, when executed by an electronic device, causes the electronic device to perform the method for virtual channel management as above.

Another embodiment provides a multimedia reproduction system, including a display unit, a storage unit, a network unit, and a control unit. The control unit, coupled to the storage unit, the network unit, and the display unit, is operative to group first electronic program list data according to at least two condition factors from a plurality of condition factors to generate at least a first set of two-dimensional program list data, wherein the at least two condition factors are not related to program broadcasting time. The control unit is operative to display the at least the first set of two-dimensional program list data on a screen of the multimedia reproduction system, wherein the screen displays a plurality of image blocks on a first plane, the image blocks on the first plane individually represent at least a portion of programs corresponding to the first set of two-dimensional program list data and are arranged on the first plane according to first and second coordinate axes corresponding to first and second condition factors of the at least two condition factors. When the system receives a selection indication, a program represented by one of the image blocks corresponding to the selection indication is played on the screen of the multimedia reproduction system.

The above and other aspects of the disclosure will become better understood with regard to the following detailed description of the preferred but non-limiting embodiments. The following description is made with reference to the accompanying drawings.

BRIEF DESCRIPTION OF THE DRAWINGS

FIG. 3 is a flowchart illustrating an embodiment of a method for providing an electronic program guide.

FIGS. 5 and 6 illustrate embodiments of electronic program guides presented by the method of FIG. 3 or 4.

DETAILED DESCRIPTION

Figure 1:
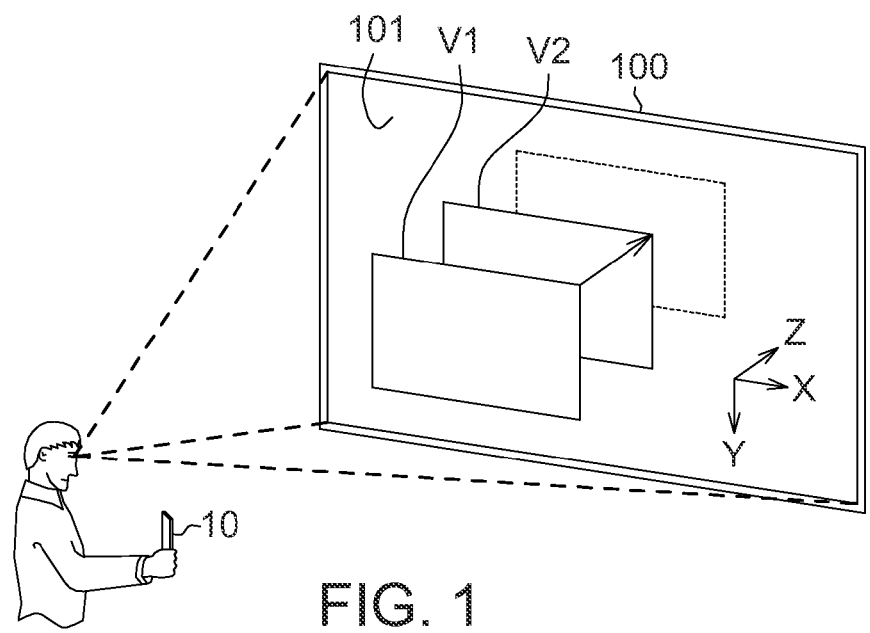
FIG. 1 is a schematic diagram of a multimedia reproduction system providing an electronic program guide according to an embodiment.

Referring to FIG. 1, a schematic diagram illustrates a multimedia reproduction system providing an electronic program guide according to an embodiment. For example, a multimedia reproduction system 100 is a display and/or playback system such as a digital television, Internet television, smart television, network-based multimedia player. These systems are configured to be display and/or playback systems that can link to multimedia sources on the Internet (e.g., through wired or wireless manner), and/or video sources of digital television broadcasting, and/or multimedia sources accessing internal or external storage devices.

As illustrated in FIG. 1, a screen 101 of the multimedia reproduction system 100 provides an electronic program guide on multiple planes presented in a two- or three-dimensional manner. Taking the three-dimensional manner as an example, a number of planes, such as planes V1 and V2, displayed on the screen 101, are arranged in the foreground and background according to directions of three coordinate axes, namely, X, Y, and Z, for the users' sake of viewing the program information presented on the planes V1 and V2. The arrangement of the program information on the planes are presented in a manner different from the conventional manner according to program broadcasting time, in order for the user to effectively select what program one wants to play (i.e., digital contents, such as digital videos, digital image/audio, and/or network video or image/audio.

In some embodiments, the user can change the relative position, distance, sizes, or arrangement of presence for the planes on the screen 101 by one or more control manners, for example, using an electronic device 10, for example, a remote controller, handheld device (such as a smart phone, tablet computer), and/or utilizing a control manner such as gesture control and/or voice control. In addition, in some embodiments, the user can control a viewing angle with respect to the screen 101 so as to view the electronic program guide and make a selection from it conveniently.

Figure 2:
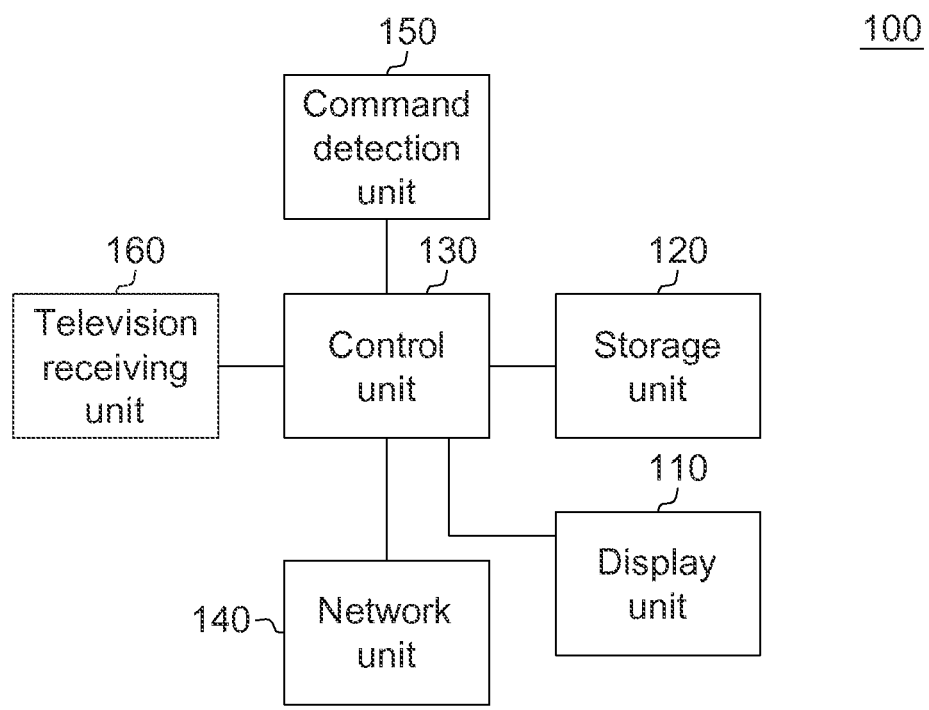
FIG. 2 is a block diagram illustrating an embodiment of a multimedia reproduction system.

FIG. 2 illustrates an embodiment of a multimedia reproduction system 100 in a block diagram. The multimedia reproduction system 100 includes a display unit 110, a storage unit 120, a control unit 130, a network unit 140, wherein the control unit 130 is coupled to the display unit 110 and the network unit 140. Depending on design requirements, the multimedia reproduction system 100 may further include other devices: a television receiving unit 160, for example, including such as an analog or digital television tuner, and television signal processing circuitry; and an audio unit (not shown), for example, including such as an audio processor, an amplifier and a speaker. In addition, a command detection unit 150, for example, implemented by physical buttons, and/ or a receiver (e.g., wired or wireless) for the remote controller, and/or a detection device for voice recognition, facial recognition, or gesture recognition, may be included and operated in conjunction with the above control manner implemented employs above.

FIG. 3 illustrates a flowchart of an embodiment of a method for providing an electronic program guide. The method can be applied to the multimedia reproduction system 100, for example, to provide an electronic program guide. In addition, referring to FIGS. 5-7, the embodiments of the electronic program guides are shown. The texts in the image blocks and the shapes of the image blocks are shown for the sake of illustration, and the electronic program guide thus is not limited thereto; for example, each image block can be shown in the same or different shape, such as circles, polygons, or icons, or other forms.

Referring to FIG. 3, in step S110, first electronic program list data are grouped according to at least two condition factors from a plurality of condition factors to generate at least a first set of two-dimensional program list data, for example, by using the control unit 130 of the multimedia reproduction system 100, wherein the at least two condition factors are not related to program broadcasting time (i.e., the sequence of time for programs be broadcast).

In step S120, the display unit 110 of the multimedia reproduction system 100 is controlled to display at least the first set of two-dimensional program list data on the screen 101 of the multimedia reproduction system 100. As illustrated in FIG. 5 or 6, the screen 101 displays a plurality of image blocks (e.g., image blocks of a column A1, images blocks B1, B2 on a row) on a first plane. The image blocks on the first plane individually represent a portion of or all programs corresponding to the first set of two-dimensional program list data, and are arranged according to a first coordinate axis (e.g., X axis) and a second coordinate axis (e.g., Y axis) corresponding to a first condition factor (e.g., a condition factor according to programs published from the latest to earlier or a condition factor according to programs by length in time) and a second condition factor (e.g., a condition factor according to channel sequence) of the at least two condition factors.

When the multimedia reproduction system 100 receives a selection indication, which is associated with one of the image blocks, for example, by using the remote controller or gesture recognition to select an image block B1, the multimedia reproduction system 100 displays a program represented by the image block corresponding to the selection indication, on the screen. As an instance, in FIG. 5 where the X axis is associated with a condition factor according to "programs published from the latest to earlier," the image block B1 represents a program (abbreviated as PRG in Figures) 1 published at 08:00 of 12/5 on the channel 1, and the image block B2 represents a program 2 published at 19:24 of 12/4 on the channel 1. As another instance, in FIG. 6 where the X axis is associated with a condition factor according to "according to programs by length in time," the image block B1 represents a program 1 of 60 m25 s in length of time on the channel 1, and the image block B2 represents a program 2 of 48 m12 s in length of time on the channel 1.

Figure 7:
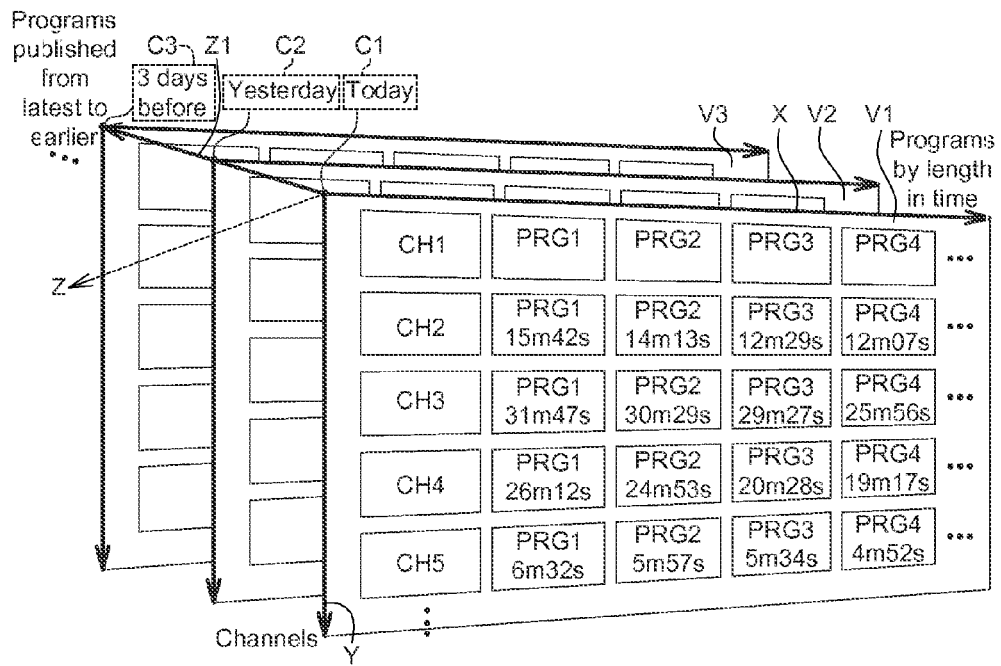
FIG. 7 illustrates an embodiment of an electronic program guide of FIG. 6 presenting in a 3-D space showed by a screen of a multimedia reproduction system.

Further in some embodiments, the electronic program list can be presented in a three-dimensional manner in addition to the two-dimensional manner. In these embodiments, the at least two condition factors, as depicted in step S110, further include a third condition factor not related to program broadcasting time, and step S110 further generates a second set of two-dimensional program list data. In addition, step S120 further displays the second set of two-dimensional program list data or more sets of two-dimensional program list data on the screen 101. Referring to FIG. 7, the screen 101 displays a plurality of image blocks on a first plane V1 and a second plane V2; the image blocks on the second plane V2 individually represent at least one portion or all of programs corresponding to the second set of two-dimensional program list data, and are arranged according to a first coordinate axis (e.g., the X axis) and a second coordinate axis (e.g., the Y axis) corresponding to a first condition factor (e.g., a condition factor according to programs by length in time) and a second condition factor (e.g., a condition factor according to channel sequence). Moreover, the screen 101, as shown in FIG. 7, further displays the first plane V1 and the second plane V2 arranged in a three-dimensional space simulated on the screen 101 according to a third coordinate axis (e.g., a Z1 axis) corresponding to the third condition factor (e.g., a condition factor according to programs published from the latest to earlier). As exemplified in FIG. 7, the first plane V1 and the second plane V2 are associated with or correspond to the programs published "Today" and "Yesterday," respectively and thus arranged along with the axis Z1 in the foreground and background. In one embodiment, the screen 101 the screen further displays corresponding parameters corresponding to the first plane V1 and the second plane V2 according to the third condition factor (e.g., a condition factor according to programs published from the latest to earlier) in the three-dimensional space. For example, the screen 101 displays parameters "Today" and "Yesterday," indicated by legends C1 and C2. Further, when step S110 generates more sets of two-dimensional program data, the screen 101 can present more corresponding planes, for example, a third plane V2 in FIG. 7, which is associated with a parameter "3 days before."

It should be noted that in the embodiments related to displaying program list in a three-dimensional manner, the Z1 axis can be realized to coincide with or not coincide with the axis Z that is perpendicular to a plane formed by the X and Y axes. For example, the Z1 axis in FIG. 7 is located above the Z axis (or any location) so that the planes V1 and V2 with the programs corresponding to "Today" and "Yesterday" can be presented with different angles along the Z1 axis for the sake of viewing. The multimedia reproduction system 100 can be configured by way of hardware and/or software to implement the above user's control manner so that the user can select one or some planes of the screen 101 and further change the relative position or distance or sizes, or arrangement of presence for the selected plane(s), for the sake of viewing. Further, in some embodiments, the user can control the viewing angle and/or the axis Z1 with respect to the user on the screen 101 so as to view the program list and select a program from it conveniently and flexibly.

In addition, according to other embodiments, the method for provide an electronic program guide can be implemented as: (a) generating one or more sets of two-dimensional program list data by finding data items of programs from first electronic program list data according to at least two condition factors and grouping the found data items (which can regarded as an embodiment of step S110); (b) performing space mapping processing on the one or more sets of two-dimensional program list data according to geometrical characteristics of the two- or three-dimensional space to be simulated on the screen 101, for example, by using the control unit 130 (or display unit 110), to map the one or more sets of two-dimensional program list data onto each corresponding plane on the two- or three-dimensional space to be simulated on the screen 101, and displaying on the screen 101 (which can be regarded as an embodiment of step S120). For instance, videos (regarded as TV programs) from the Internet are accompanied with some labels (e.g., RSS or ATOM labels) that are provided by information service providers, and thus the searching for programs can be made with respect to the corresponding labels according to one or more condition factors. In addition, if the information service providers do not provide the video's length in time, the length in time can be obtained when the system reads the video.

The multimedia reproduction system 100 can be configured by way of hardware and/or software to present the program list according to the above mentioned two- or three-dimensional manner. For example, step S120 can be implemented by using a graphics engine or using graphics functionality of a graphics processing unit of the multimedia reproduction system 100. As an example, the display unit 110 may include: a hardware graphics engine, a video engine, and video buffer memory (not shown), wherein the graphics engine and the video engine are coupled to a display device through the video buffer memory; thus, the control unit 130 (or processing unit) can designate internal circuitry of the display unit 110 for graphics processing (or the above space mapping processing). Further, step S120 can also realized by application program interfaces of software graphics engine.

Figure 4:
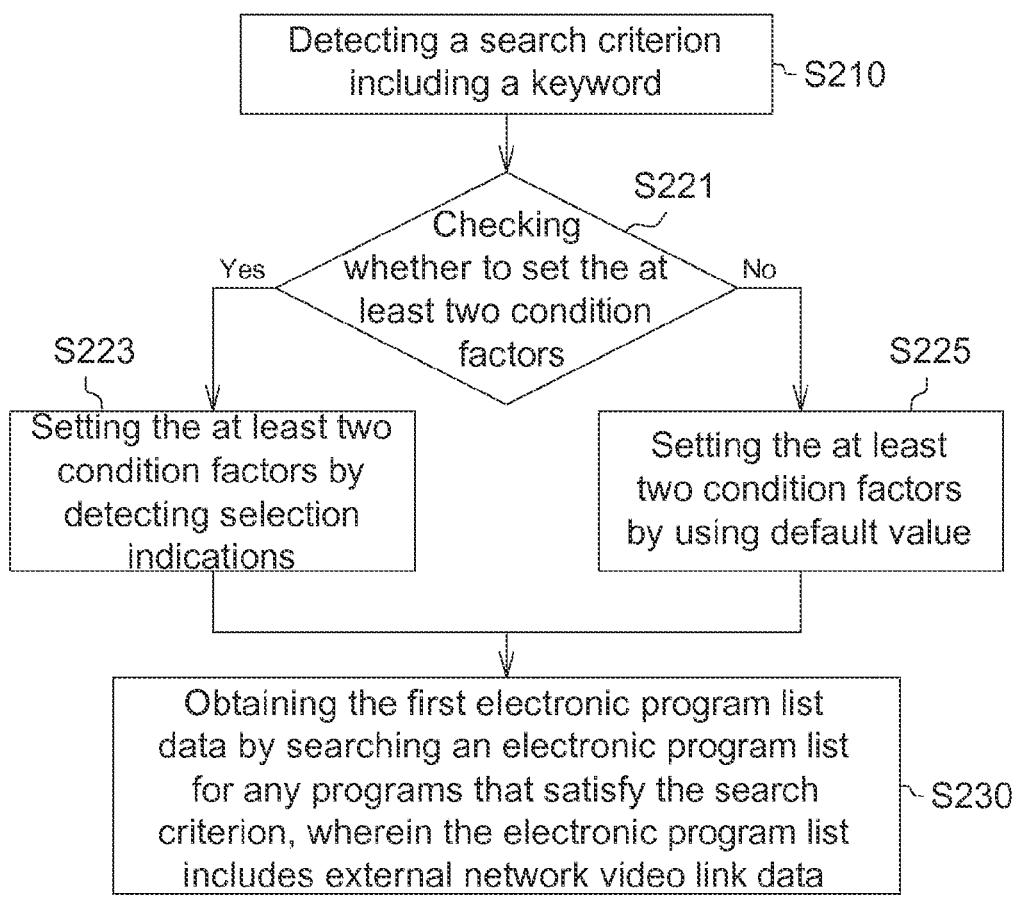
FIG. 4 is a flowchart illustrating another embodiment of a method for providing an electronic program guide.

In addition, referring to FIG. 4, a flowchart illustrates another embodiment of a method for providing an electronic program guide. The method can be applied to the multimedia reproduction system 100 and executed before step S110 to search the electronic program guide or obtain a corresponding electronic program guide after network searching.

In step S210, the multimedia reproduction system 100 detects a search criterion including a keyword so as to instruct the multimedia reproduction system 100 to search for digital contents regarding the keyword, wherein the keyword may be a letter(s), word(s), phrase(s), or sentence(s). For example, step S210 is performed by the command detection unit 150 and the control unit 130 (or processing unit).

In step S221, the control unit 130, for example, is employed to check whether to set the at least two condition factors. If so, as shown in step S223, the at least two condition factors are set by the multimedia reproduction system 100 detecting selection indications (e.g., in the way of the above-mentioned control manner of the user). As an example, the user employs the remote controller 10 or other user control manner to indicate that the setting is going to be performed, and then selects the at least two condition factors from a plurality of condition factors on the screen 101; i.e., selecting the condition factors corresponding to the X and Y axes (or even the Z1 axis). If it needs not to do the setting (e.g., which is automatically decided or indicated by the user), the multimedia reproduction system 100, as shown in step S225, sets the at least two condition factors by using default values, for example, the condition factors of the X and Y axes (or the Z1 axis) in the embodiments of FIGS. 5-7.

As shown in step S210, the first electronic program list data, as described in step S110, is obtained by searching an electronic program list (e.g., an electronic program list database of the multimedia reproduction system 100, stored in the storage unit 120) for any programs that satisfy the search criterion (e.g., including the keyword). The electronic program list includes external network video link data, for example, link data of digital contents such as network video, image, or audio, defined in terms of links (e.g., URL) and/or XML (extended markup language) obtained by searching the video providing websites according to the search criterion.

In the above embodiments of the multimedia reproduction system 100 or the method for providing an electronic program guide, at least one of the first, the second, and the third condition factor is at least one of a set of following condition factors, or any arbitrary combination or arrangement. The set of condition factors are: condition factors according to channel sequence, according to time that each program is published, according to length of time for each program, and according to program category. The description of each condition factor is as follows. (a) Channel sequence: arrangement is made in an order according to the channel number. (b) Time that each program is published: the video from the network has its published time; in general, the arrangement is made in an order from the latest to the earliest, i.e., the latest one is put in the front; other orders of arrangement can also be done, for example, an order from today, yesterday, to the day before yesterday. (c) Length of time for each program: the arrangement is made in an order by the length of time for each program which may be different for network videos; for example, the shortest is put in the front; other orders of arrangement can also be done, for example, an order determined by within 5 min, 5-30 min, 30-60 min. (d) Program category: programs can be categorized into, for example, news, sports, music, knowledge, entertainment and so on. The above examples are for the sake of illustration, and the implementation is thus not limited thereto.

As shown in FIGS. 5-7, embodiments illustrate electronic program guides presented by the method of FIG. 3 or 4. FIG. 7 illustrates an embodiment of the electronic program guide of FIG. 6 presented in the three-dimensional space simulated in the screen 101 of the multimedia reproduction system 100.

FIGS. 8-13 are the other embodiments illustrating electronic program guides presented by the method of FIG. 3 or 4.

Figure 8:
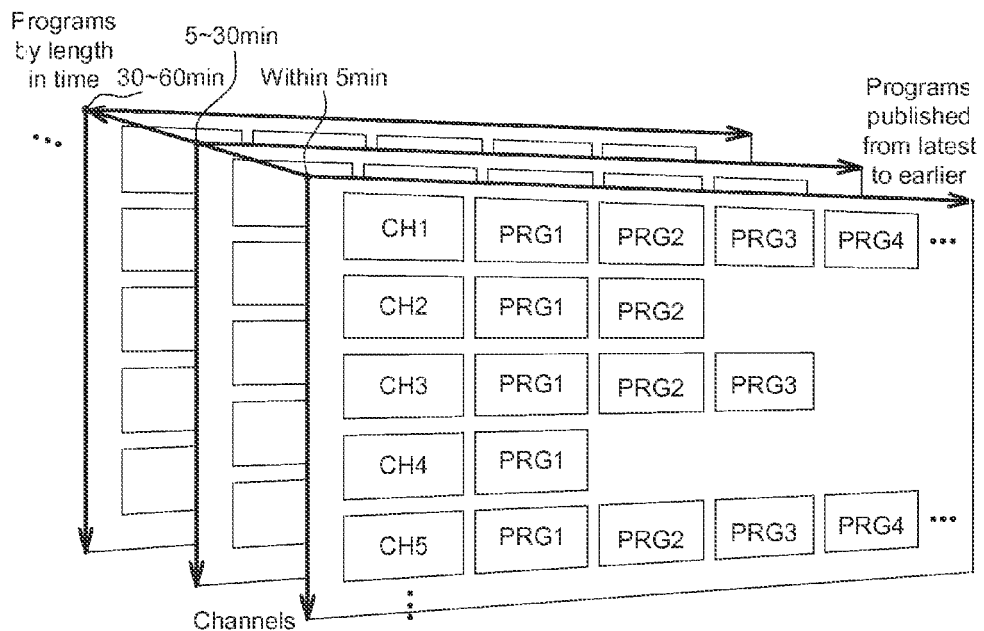
FIGS. 8-13 illustrate other embodiments of electronic program guides generated according to the method of FIG. 3 or 4.

As shown in FIG. 8, the programs are arranged according to the X, Y, and Z1 axes corresponding to the condition factors according to programs published from the latest to earlier, channel sequence, and programs by length in time, respectively.

Figure 9:
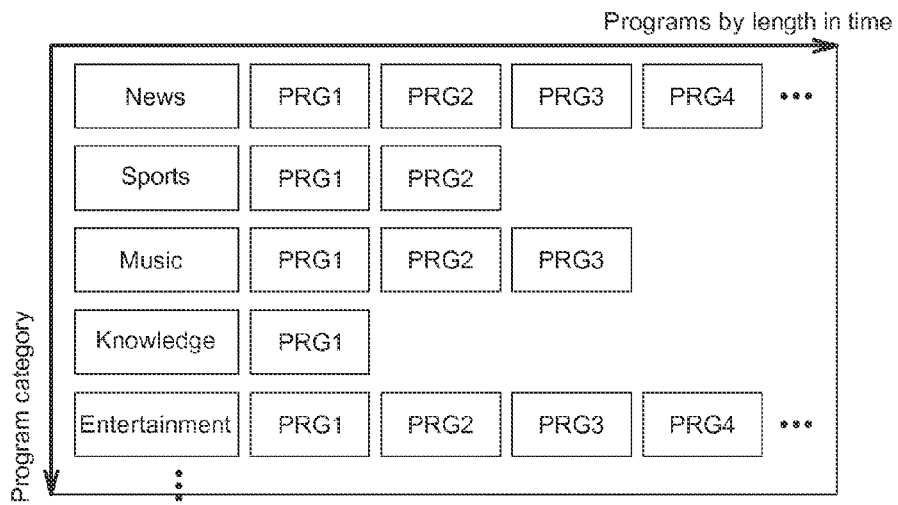
Figure 10:
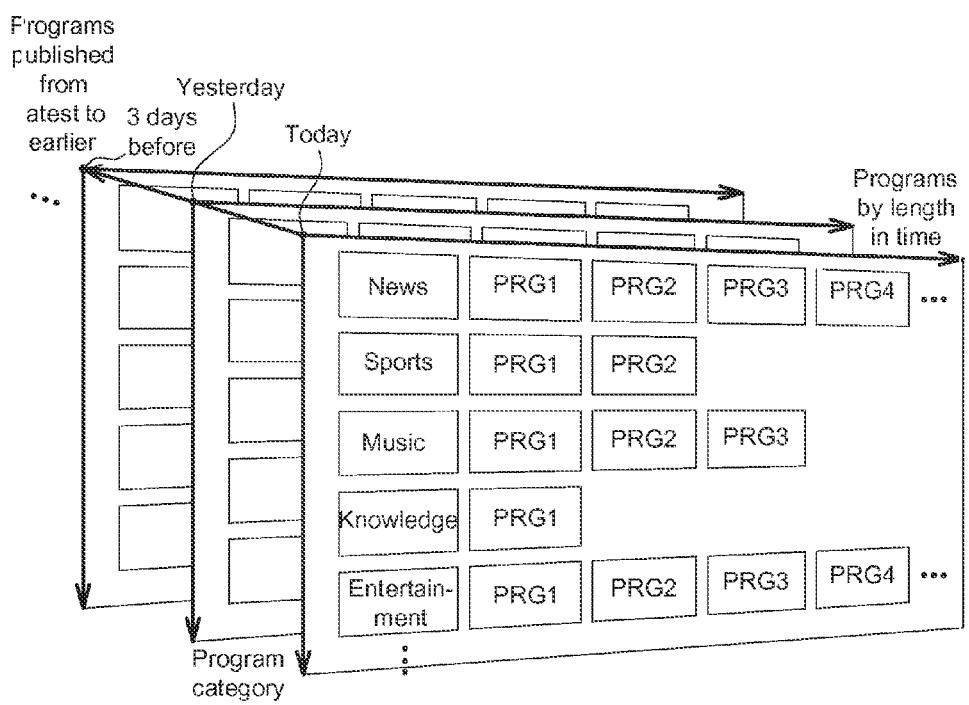
Figure 11:
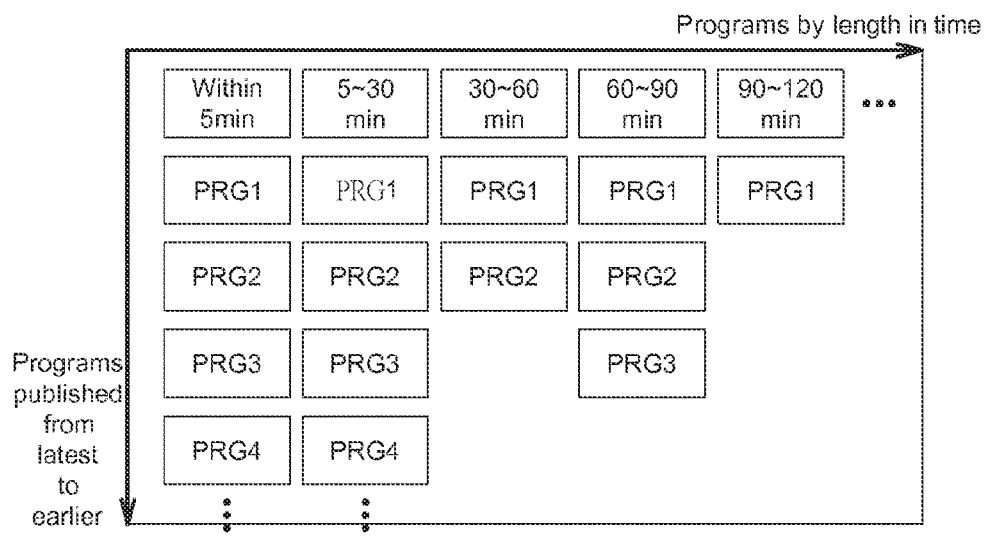
Figure 12:
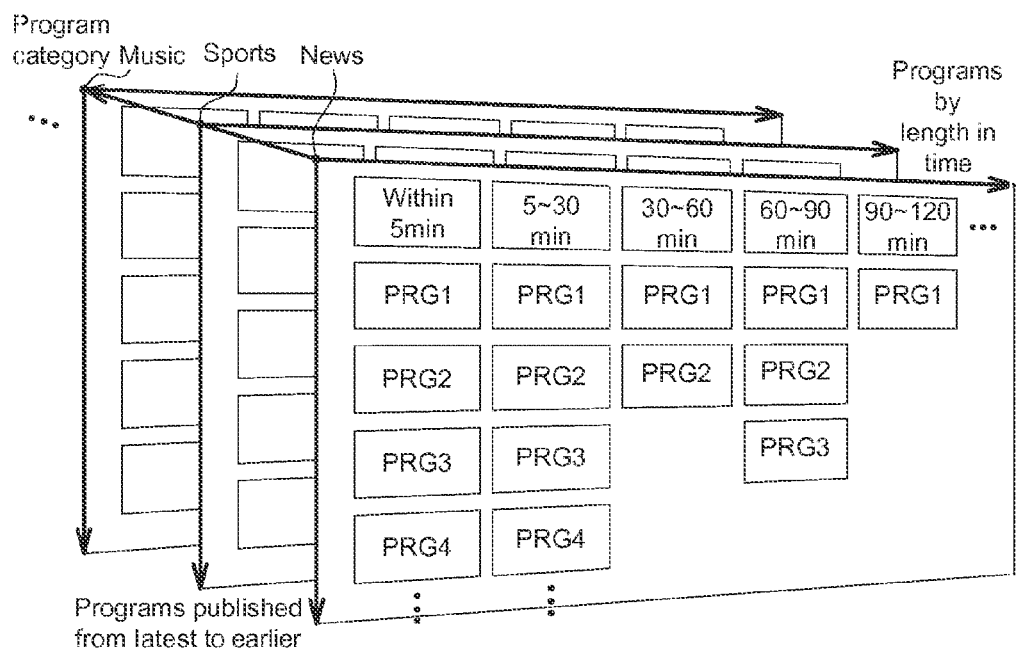

As shown in FIG. 9, the programs are arranged according to the X and Y axes corresponding to the condition factors according to programs by length in time and program category, respectively. As shown in FIG. 10, the programs are arranged according to the X, Y, and Z1 axes corresponding to the condition factors according to programs by length in time, program category, and programs published from the latest to earlier, respectively. As shown in FIG. 11, the programs are arranged according to the X and Y axes corresponding to the condition factors according to programs by length in time, and programs published from the latest to earlier, respectively. As shown in FIG. 12, the programs are arranged according to the X, Y, and Z1 axes corresponding to the condition factors according to programs by length in time, programs published from the latest to earlier, and program category, respectively.

In some embodiments, the manner of displaying the electronic program guide can be changed on the screen 101 of the multimedia reproduction system 100 from a two-dimensional manner, for example, as illustrated in FIG. 9 (or FIG. 11) to a three-dimensional manner, for example, as illustrated in FIG. 10 (or FIG. 12), and/or vice versa. In some embodiments, the multimedia reproduction system 100 can be implemented to display the electronic program guide on the screen 101 in a three-dimensional manner, as shown in FIG. 7, 8, 10, 12, or 13; the condition factor(s) of at least one coordinate axis can be switched or changed to another one by using any one of user control manner (e.g., by the button of the remote controller 10, or voice or gesture control); or the condition factors of any two coordinate axes can be exchanged, for example, the electronic program guide of FIG. 10 changed to that of FIG. 12 by exchanging the condition factors of the Y and Z1 axes, and vice versa. The above embodiments are convenient for the user to view the electronic program guide and select the program from it conveniently and flexibly.

In other embodiments, the first plane V1 can cover a portion of the second plane V2, and the other planes can be done accordingly. In addition, the portion which is not covered by another plane can be presented in some degree of translucence.

Figure 13:
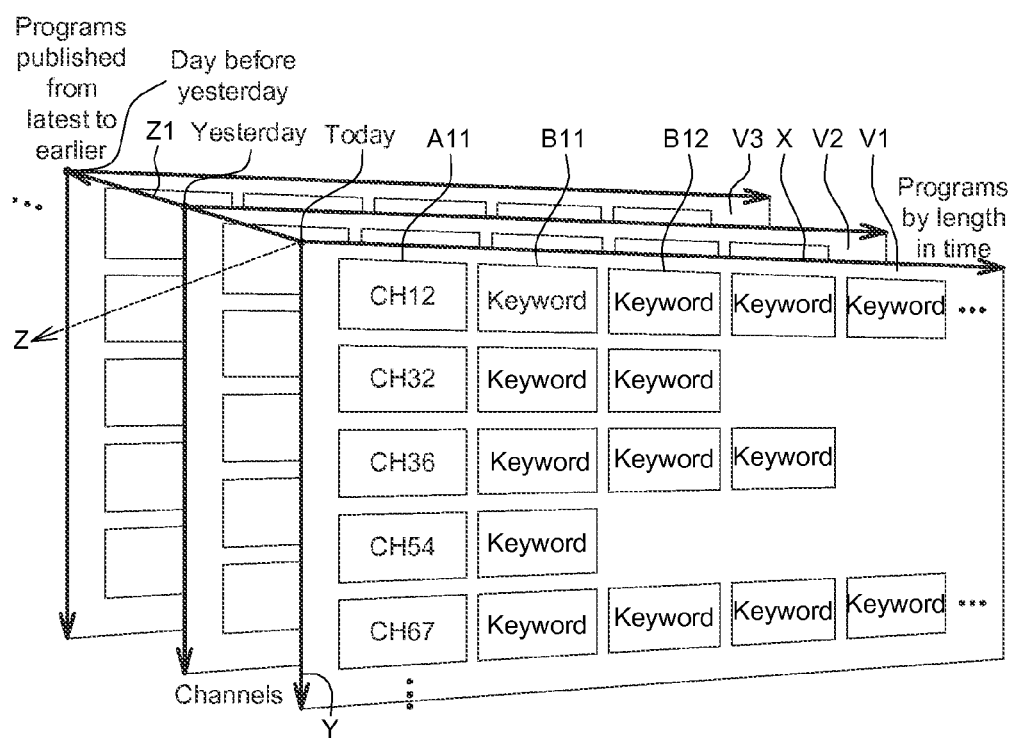

In addition, for the embodiment of FIG. 4, the search criterion includes the keyword (e.g., Oscar Ang Lee), the search result presented by using step S120 can be shown by different manner as shown in FIGS. 5 to 13 or related embodiments as mentioned above. Besides, at least a portion of the image blocks on the screen 101 of the multimedia reproduction system 100 can display corresponding descriptions of the external network video link data, where each description may include the keyword. Referring to FIG. 13, on the first plane V1, a column A11 corresponds to a number of channels and the search result for each channel, and the image block B11 and B12 of a channel 12 may display description including the keyword, for example. As an example, the image block B11 displays: "Acceptance speech of Ang Lee who wins best director Oscar again" and corresponds to the video link on YouTube regarding the speech. In another example, the image block B12 displays: "Interview of Ang Lee from Taiwan who wins best director Oscar" and corresponds to the video link on YouTube regarding the interview, wherein "Ang Lee" and "Oscar" can be specifically indicated or emphasized, such as in bold, foreground color, or background color so as to make the user easy to read and find the program one wants.

The concepts of channels as mentioned above can be extended to the concept of virtual channels. In some embodiments, the multimedia reproduction system 100 presents a search result in the form of a program list on the screen 101 of the multimedia reproduction system 100. The user can make an addition to the channel, and then the multimedia reproduction system 100 have a new virtual channel which corresponds to the contents of the program list and has a channel code (e.g., a number 1101 or other form of code). After that, the user can use the way of switching television channels, for example, entering the channel code 1101, to play the contents of the virtual channel. The user can also make a deletion of a virtual channel and amend a virtual channel. The above examples of different virtual channel management leads to the generation or change of corresponding virtual channel data. The virtual channel data, for example, include attribute data for each virtual channel, for example, attribute data for one virtual channel include at least one or more video-audio source link. In other embodiments, the program list described in the embodiment of FIG. 4 can be regarded as including virtual channels of the multimedia reproduction system 100 and/or general digital television channel programs and/or search result from the external network.

In addition, referring to FIG. 2, if the multimedia reproduction system 100 is realized as a network-based multimedia player (e.g., a digital multimedia receiver, such as Apple TV, network setup box), the display unit 110 can be implemented by a display screen integrated with the network-based multimedia player or regarded as a display screen connected to the network-based multimedia player in a wired or wireless manner. Hence, the ways of implementation of the network-based multimedia reproduction system 100 is not limited to the system of FIG. 2; for example, the control unit 130 can be connected to the display unit 110 and memory or other device (e.g., an audio unit) through a memory bus. The structure mentioned in the above description is for the sake of convenience for explanation, and the implementation is not limited thereto.

Furthermore, in some embodiments for practical application, the multimedia reproduction system 100 can also be implemented to show an electronic program guide according to program broadcasting time when it is required to do so.

Other embodiments provide a computer or electronic device readable storage medium having stored program code, or one or more program or program modules, for performing the method for providing an electronic program guide. For example, the steps in FIG. 3 or 4 can be implemented as program modules. The electronic device (e.g., implemented as a multimedia reproduction system), when executes such program code, causes the electronic device to perform the method for providing an electronic program guide according to the embodiment of FIG. 3 or 4, or other related embodiment. The readable information storage medium in each of the embodiments can be implemented by, without limitation to, an optical information storage medium, a magnetic information storage medium or a memory, such as a memory card, firmware, ROM or RAM, or built-in memory in a programmable microcontroller.

While the invention has been described by way of example and in terms of the preferred embodiments, it is to be understood that the invention is not limited thereto. On the contrary, it is intended to cover various amendments and similar arrangements and procedures, and the scope of the appended claims therefore should be accorded the broadest interpretation so as to encompass all such amendments and similar arrangements and procedures.

What is claimed is:

1. A method for providing an electronic program guide for use in a multimedia reproduction system, the method comprising:

at the multimedia reproduction system:

(a) grouping first electronic program list data according to at least two condition factors from a plurality of condition factors to generate at least a first set of two-dimensional program list data, wherein the at least two condition factors are not related to program broadcasting time; and (b) controlling a display unit of the multimedia reproduction system to present the at least the first set of two-dimensional program list data in a form of a virtual channel, wherein the virtual channel is with a virtual channel code and displayed on a screen of the multimedia reproduction system, wherein the screen displays a plurality of image blocks on a first plane, the image blocks on the first plane individually represent at least a portion of programs corresponding to the virtual channel and are arranged according to first and second coordinate axes corresponding to first and second condition factors of the at least two condition factors;

wherein:

in the step (a), the at least two condition factors further include a third condition factor not related to program broadcasting time, the step (a) further generates a second set of two-dimensional program list data; and in the step (b), the step (b) further displays the second set of two-dimensional program list data on the screen, wherein the screen further displays a plurality of image blocks on a second plane, the image blocks on the second plane individually represent at least a portion of programs corresponding to the second set of two-dimensional program list data and are arranged according to the first and second coordinate axes corresponding to the first and second condition factors;

wherein when the system receives a selection indication, a program represented by one of the image blocks corresponding to the selection indication is played on the screen of the system, the screen further displays the first plane and the second plane arranged in a three-dimensional space simulated on the screen according to a third coordinate axis corresponding to the third condition factor, and the third coordinate axis is controllable by a user.

2. The method according to claim 1, wherein the third condition factor is one of a set of condition factors: condition factors according to channel sequence, according to time that each program is published, according to length of time for each program, and according to program category.

3. The method according to claim 2, wherein the screen further displays corresponding parameters corresponding to the first plane and the second plane according to the third condition factor in the three-dimensional space.

4. The method according to claim 1, wherein before the step (a), further comprising:

at the multimedia reproduction system:

(g1) detecting a search criterion, the search criterion including a keyword;

(g2) checking whether to set the at least two condition factors; if so, setting the at least two condition factors by detecting selection indications; if not, setting the at least two condition factors by using default values; and (g3) obtaining the first electronic program list data by searching an electronic program list for any programs that satisfy the search criterion, wherein the electronic program list includes external network video linking data.

5. The method according to claim 4, wherein at least a portion of the image blocks on the screen displays corresponding descriptions of the external network video link data, each description includes the keyword.

6. The method according to claim 4, wherein the first or the second condition factor is one of a set of condition factors: condition factors according to channel sequence, according to time that each program is published, according to length of time for each program, and according to program category.

7. A non-transitory computer readable storage medium having stored program code of one or more program modules, which, when executed by an electronic device, causes the electronic device to perform the method for providing an electronic program guide according to claim 4.

8. A non-transitory computer readable storage medium having stored program code of one or more program modules, which, when executed by an electronic device, causes the electronic device to perform the method for providing an electronic program guide according to claim 1.

9. A multimedia reproduction system, comprising:

a display unit;

a storage unit;

a network unit; and a control unit, coupled to the storage unit, the network unit, and the display unit, the control unit operative to group first electronic program list data according to at least two condition factors from a plurality of condition factors to generate at least a first set of two-dimensional program list data, wherein the at least two condition factors are not related to program broadcasting time;

wherein the control unit is operative to present the at least the first set of two-dimensional program list data in a form of a virtual channel, wherein the virtual channel is with a virtual channel code and displayed on a screen of the multimedia reproduction system, wherein the screen displays a plurality of image blocks on a first plane, the image blocks on the first plane individually represent at least a portion of programs corresponding to the virtual channel and are arranged on the first plane according to first and second coordinate axes corresponding to first and second condition factors of the at least two condition factors;

wherein:

the at least two condition factors further include a third condition factor not related to program broadcasting time, the control unit is further operative to generate a second set of two-dimensional program list data; and the control unit is further operative to control the display unit to further display the second set of two-dimensional program list data on the screen, wherein the screen further displays a plurality of image blocks on a second plane, the image blocks on the second plane individually represent at least a portion of programs corresponding to the second set of two-dimensional program list data and are arranged according to the first and second coordinate axes corresponding to the first and second condition factors;

wherein when the system receives a selection indication, a program represented by one of the image blocks corresponding to the selection indication is played on the screen of the multimedia reproduction system, the screen further displays the first plane and the second plane arranged in a three-dimensional space simulated on the screen according to a third coordinate axis corresponding to the third condition factor, and the third coordinate axis is controllable by a user.

10. The system according to claim 9, wherein the third condition factor is one of a set of condition factors: condition factors according to channel sequence, according to time that programs are published, according to length of time for programs, and according to program category.

11. The system according to claim 9, wherein the multimedia reproduction system:
   detects a search criterion, the search criterion including a keyword;
   check whether to set the at least two condition factors; if so, setting the at least two condition factors by detecting selection indications; if not, setting the at least two condition factors by using default values; and
   obtains the first electronic program list data by searching an electronic program list for any programs that satisfy the search criterion, wherein the electronic program list includes external network video linking data.

12. The system according to claim 11, wherein at least a portion of the image blocks on the screen displays corresponding descriptions of the external network video link data, each description includes the keyword.

13. The system according to claim 11, wherein the first or the second condition factor is one of a set of condition factors: condition factors according to channel sequence, according to time that programs are published, according to length of time for programs, and according to program category.

* * * * *